United States Patent [19]

Mater et al.

[11] 4,039,849

[45] Aug. 2, 1977

[54] WIND POWERED GENERATING SYSTEMS

[75] Inventors: Milton H. Mater; Robert E. Torley, both of Corvallis, Oreg.

[73] Assignee: Milton H. Mater, Corvallis, Oreg.

[21] Appl. No.: 563,597

[22] Filed: Mar. 31, 1975

[51] Int. Cl.² ............................................. F03D 9/00
[52] U.S. Cl. ...................................... 290/55; 290/44; 416/119; 416/197 A
[58] Field of Search .............. 290/55, 44; 416/197 A, 416/119, 111, 139, 140, DIG. 4, 141

[56] References Cited

U.S. PATENT DOCUMENTS

| | | | |
|---|---|---|---|
| 752,764 | 2/1904 | Dunne | 416/119 |
| 1,555,776 | 9/1925 | Twiford | 416/197 A |
| 2,067,542 | 1/1937 | Penton | 416/119 |
| 2,812,823 | 11/1957 | DeOviedo | 416/197 A |

FOREIGN PATENT DOCUMENTS

| | | | |
|---|---|---|---|
| 733,997 | 7/1932 | France | 416/119 |

*Primary Examiner*—Robert S. Macon
*Attorney, Agent, or Firm*—Klarquist, Sparkman, Campbell, Leigh, Hall & Whinston

[57] ABSTRACT

An electric battery powered automobile has a wind driven rotor device driving a generator to furnish supplementary power to batteries of the electrical power system of the automobile. The rotor device includes a power rotor having a pair of curved blades forming an overlapping, S configuration, and an outer series of turbine blades which pivot to provide minimum resistance when moving into the wind and provide maximum power when moving with the wind. The rotor device is mounted between two discs one of which serves as the armature of an electrical power generator. The generator has a plurality of parallel windings which at low speeds are connected in series to the batteries and, at high speeds, are connected in parallel to the batteries. The armature can be mounted separately and caused to couple with the rotor assembly through a clutch when the rotor has reached a desired speed. A further embodiment includes a rotor having tapered S-shaped blades, and/or a plurality of wind velocity responsive shutters for speed control.

9 Claims, 7 Drawing Figures

WIND

WIND POWERED GENERATING SYSTEMS

DESCRIPTION

This invention relates to improved wind powered generating systems and has for an object thereof the provision of improved wind powered generating systems.

Another object of the invention is to provide a wind powered system on an automobile and adapted to supply auxiliary electric power to the automobile.

A further object of the invention is to provide an improved wind powered generator system having a driven rotor provided with a plurality of pairs of generally S-shaped blades disposed equiangularly.

Another object of the invention is to provide an improved wind powered generator having a driving rotor including a pair of inner blades of overlapping, generally S-shaped configuration, and an outer ring of turbine blades which are biased toward operative positions and which pivot to minimum wind resisting positions while moved against the wind.

Another object of the invention is to provide an improved wind powered generating system including a wind driven rotor, a flywheel and a clutch actuated to couple the flywheel to the rotor when the rotor has reached a predetermined speed.

Another object of the invention is to provide an improved wind powered electrical generating system including improved shrouding to compensate for excessive wind velocities.

Another object of the invention is to provide an improved wind powered generating system wherein an electric generator driven by a wind powered rotor has a plurality of output circuits which are connected in parallel at high rotor speeds and in series at lower rotor speeds.

Another object of the invention is to provide an improved wind powered generating system having blades of overlapping, generally S-shaped configuration doubly tapered to generally hourglass shapes.

Figure 1:
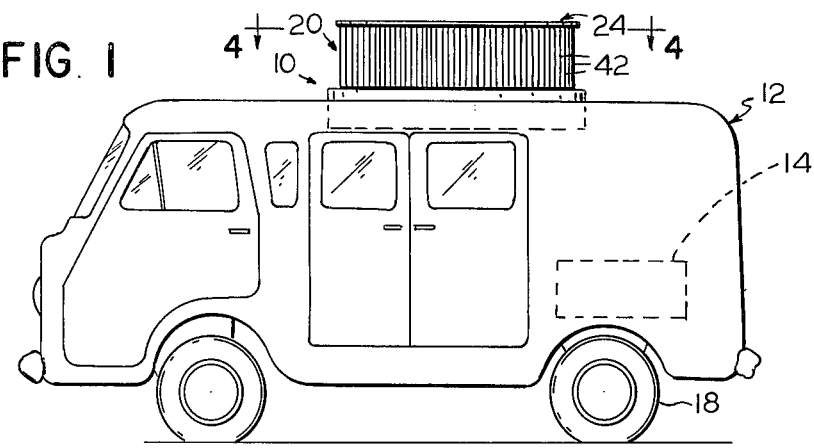
FIG. 1 is a side elevation view of an electric battery powered automobile having an improved wind powered generating system forming one embodiment of the invention.
Figure 2:
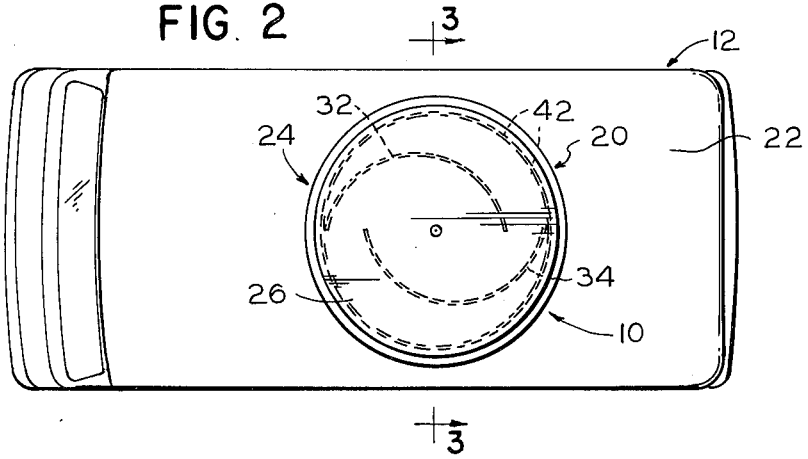
FIG. 2 is a top plan view of the automobile of FIG. 1.
Figure 3:
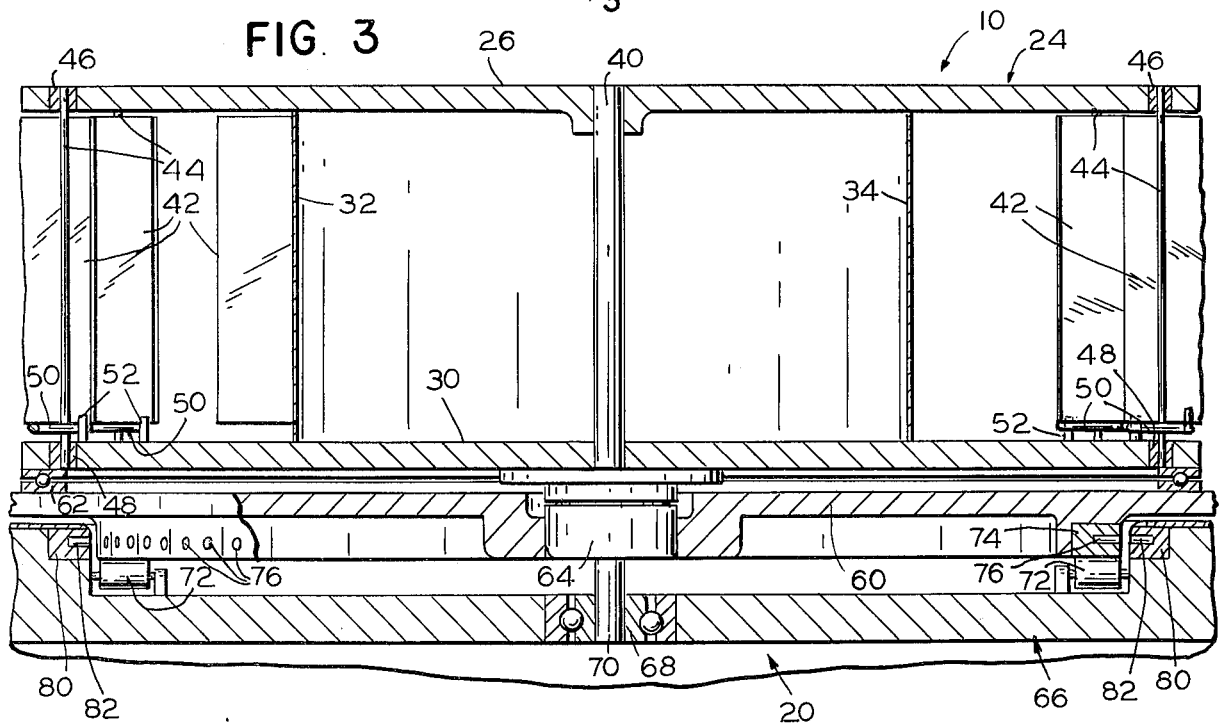
FIG. 3 is an enlarged, fragmentary, vertical sectional view taken along line 3—3 of FIG. 2.
Figure 4:
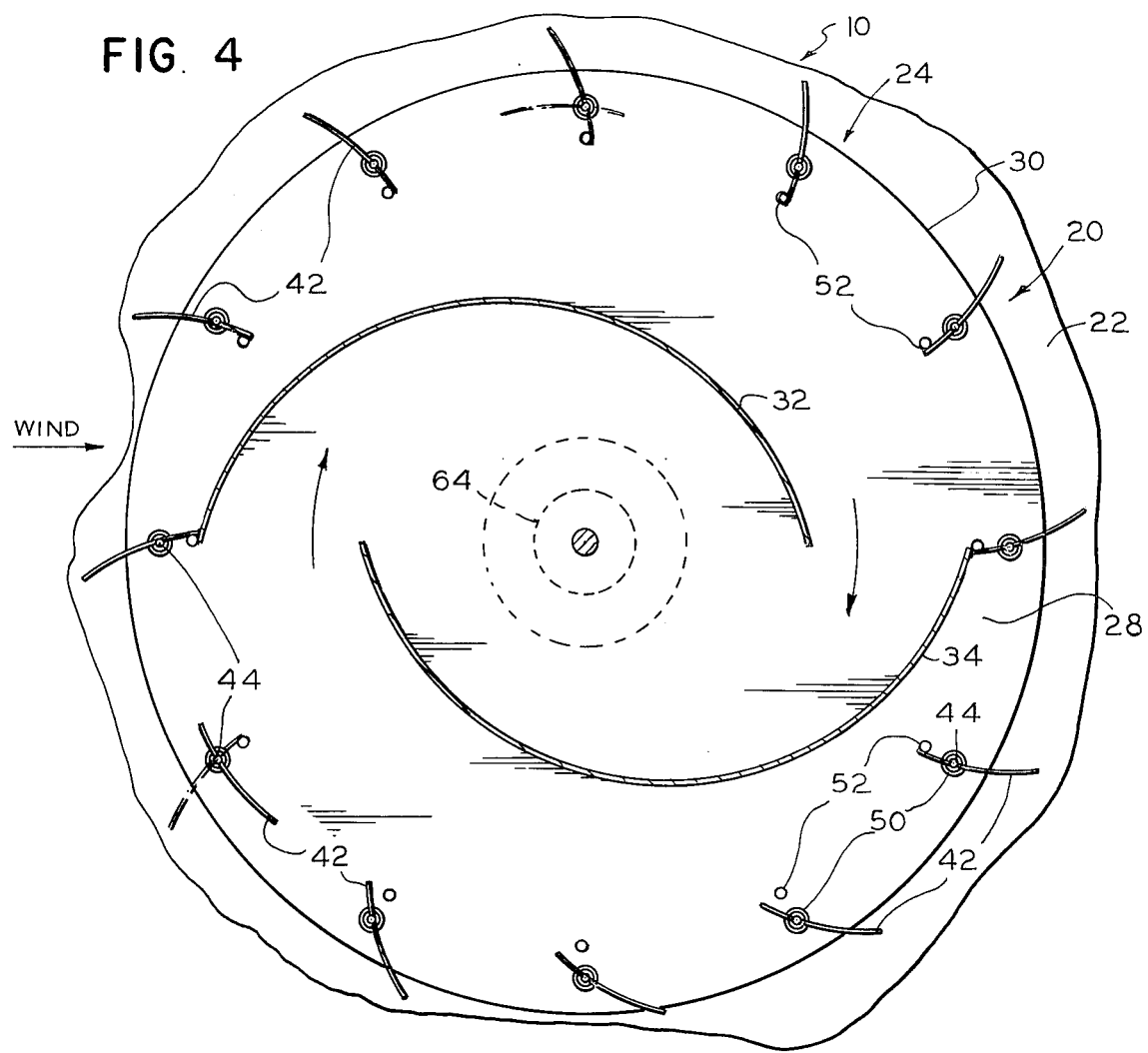
FIG. 4 is an enlarged, fragmentary, horizontal sectional view taken along line 4—4 of FIG. 1.
Figure 6:
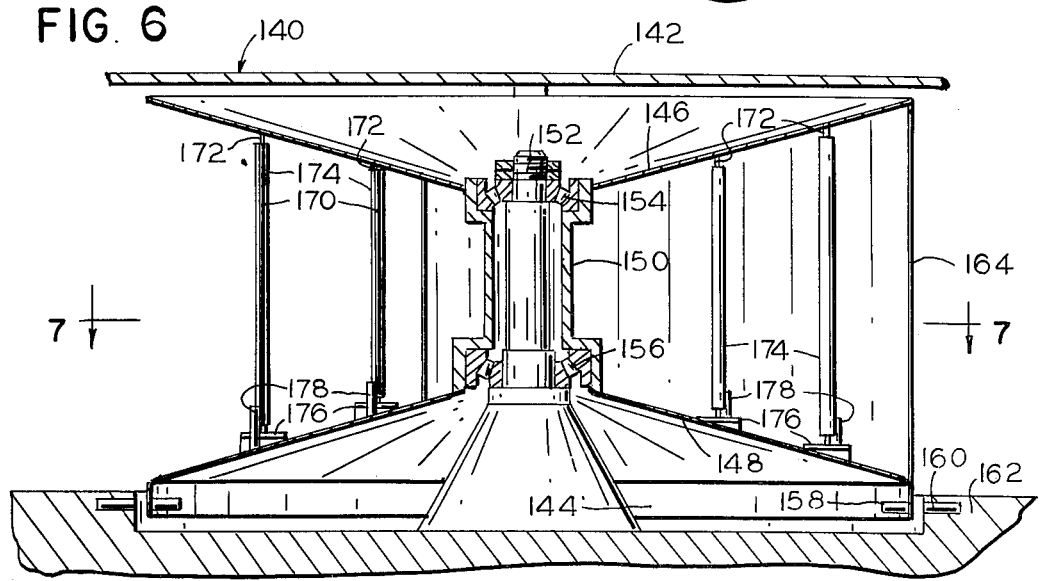
FIG. 6 is a vertical sectional view of an improved wind powered generating system forming an alternate embodiment of the invention; and, FIG. 7 is a horizontal sectional view taken along line 7—7 of FIG. 6.
Figure 5:
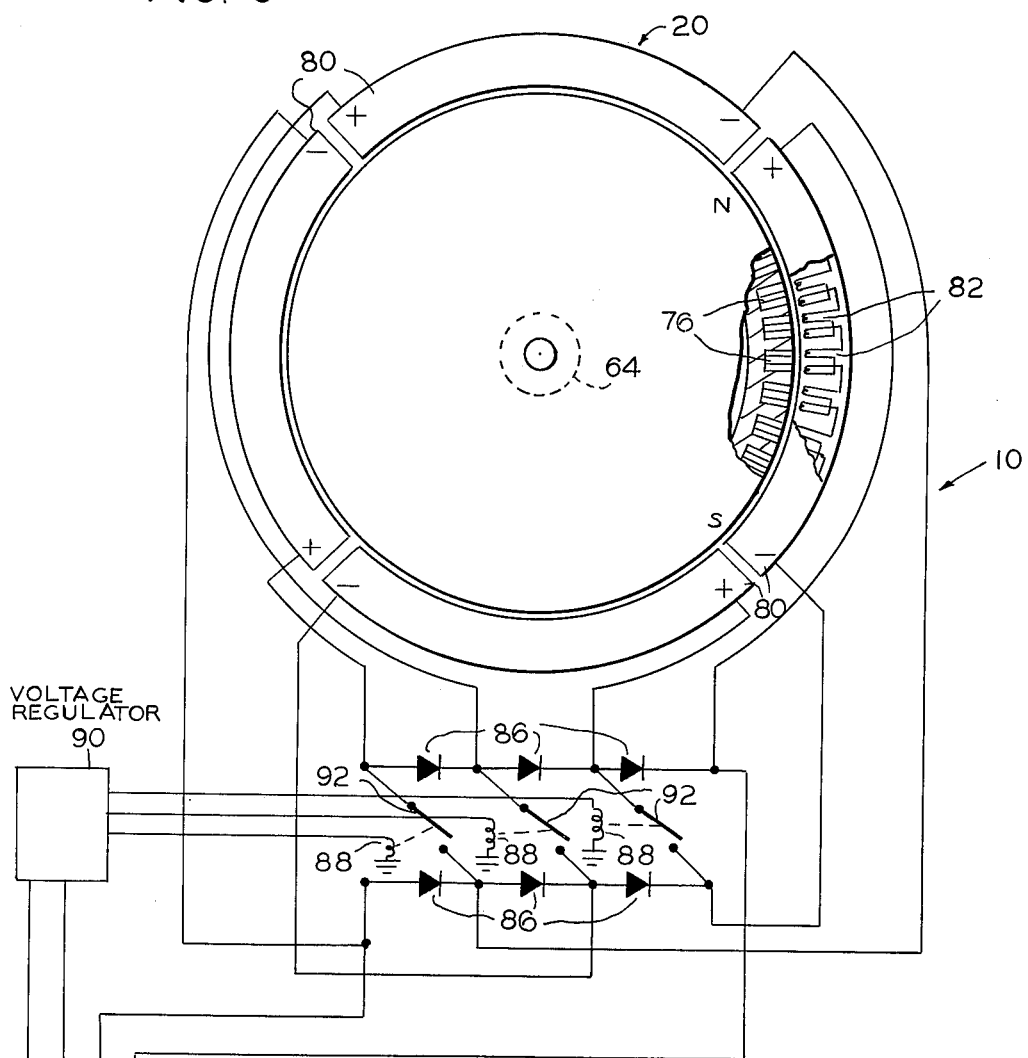
FIG. 5 is an enlarged, partially sectional, partially schematic view of the generating system of FIG. 1.
Figure 7:
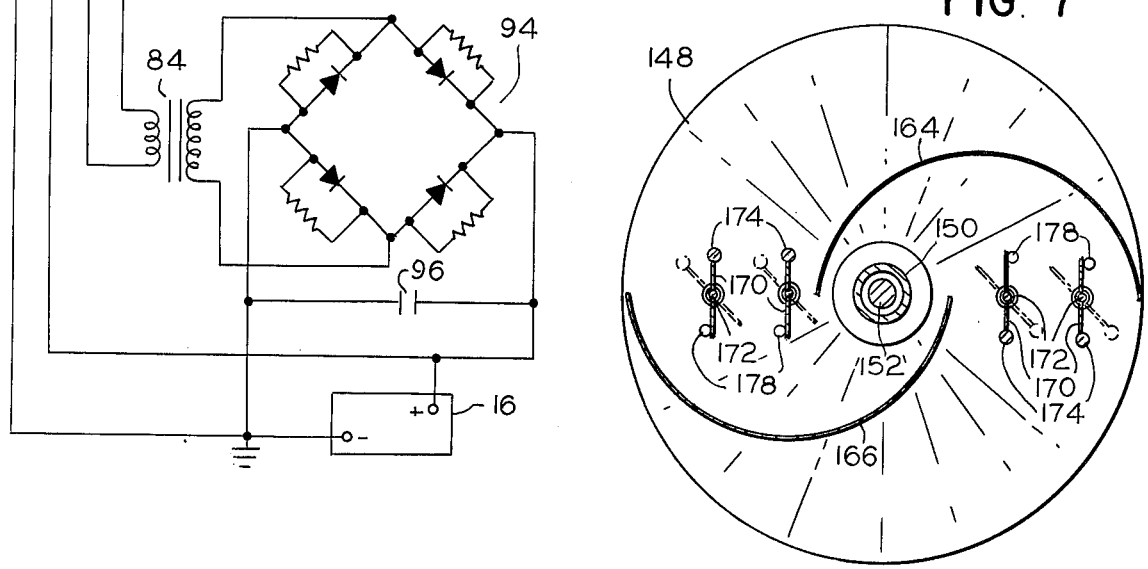

Referring now in detail to the drawings, there is shown in FIGS. 1-5 an improved wind powered generating system 10 forming one embodiment of the invention and adapted to supply power for recharging the batteries of an electrically driven automobile 12. The automobile includes a known electric power drive 14 including batteries 16 (FIG. 5) supplying an electric motor driving wheels 18 (FIG. 1) thereof. A wind driven generating device 20 is mounted on roof 22 of the automobile, and includes a rotor 24 comprising two discs 26 and 30, and a pair of arcuate or Savonius-type blades 32 and 34, the blades being fixed to the discs which are keyed to shaft 40. Outside the Savonius blades, turbine blades 42 are pivotally mounted between the discs 26 and 30 by shafts 44 rotatable in bushings 46 and 48. The turbine blades are arcuate and are biased by springs 50 toward generally radially extending positions engaging stops 52.

The rotor 24 is mounted rotatably on a flywheel 60 by radial and thrust bearings 62 between the disc 30 and the flywheel, and is adapted to be connected to the flywheel by a clutch 64. The flywheel is mounted rotatably on a cup-like base 66 secured to the roof 22. A central radial bearing 68 mounts shaft 70 fixed to the flywheel, and outer, thrust bearing 72 is positioned between annular outer ring 74 and the base. The ring 74 carries permanent magnets 76 and forms therewith an electrical generator rotor. Rim portion 78 carries four quadrants 80 having electromagnetic coils 82 spaced closely therearound and forming a generator stator. The coils of each quadrant are connected in series with each other, and each quadrant is connected by rectifiers (FIG. 5) in series with the other quadrants and a step-up transformer 84 by rectifiers 86. Then relay windings 88 are energized by voltage regulator 90, and rear contacts 92 are closed to connect the quadrants in series to the transformer 84. The secondary of the transformer 84 is connected by full-wave rectifier 94 and capacitor 96 to batteries 16 to charge the batteries. Lines 98 and 100 connect the output of the rectifier 94 to the voltage regulator 90 to cause the regulator to energize the relays 88 or drop them out as the need may be.

Preferably the clutch 64 is of the centrifugal type, which automatically connects the rotor 24 to the flywheel 60 when the speed of the rotor reaches a predetermined minimum. However, if desired, the clutch may be of the electromagnetic type and be actuated by the voltage regulator 90 through slip ring wiring (not shown) when the rotor attains the desired minimum speed utilizing a small, control voltage generator (not shown) driven by the rotor and actuating the voltage regulator. The clutch enables the rotor to get up to a wind driven predetermined minimum rotational speed before electricity is generated.

EMBODIMENT OF FIGS. 6 AND 7

An improved wind powered generating system forming an alternate embodiment of the invention includes a rotor 140 including discs 142 and 144 mounted on frustoconical shields 146 and 148 fixed to hub 150 rotatable on fixed vertical axle 152 by bearings 154 and 156. The disc 144 carries permanent magnets 158 and is the generator rotor. Coils 160 are carried by base 162 to form the generator stator. Savonius-type blades 164 and 166 are mounted on the discs.

Shutter vanes 170 mounted on shafts 172 and carrying counterweights 174 are biased by return springs 176 toward radial or open positions engaging stops 178. When the wind velocity gets excessive, it closes the shutters at the windward side of the rotor against the action of the springs. This is also augmented by the counterweights which tend to close the shutters as the speed approaches an undesirably high speed. As shown, the shafts 172 are fixed to the rotor in positions locating the vanes 170 in front of the inlet passages to the blades.

What is claimed is:

1. In a wind actuated power generator,
generally circular rotor means, a plurality of inner blades mounted on the rotor means inwardly from the periphery of thr rotor means responsive to wind flow for turning the rotor means in a predetermined direction, and a plurality of turbine blades mounted near the periphery of the rotor means and responsive to wind flow for turning the rotor means in said direction and deflecting wind flow to the inner blades.

2. The wind actuated power generator of claim 1 including means mounting the turbine blades for movement between more efficient extreme positions and less efficient extreme positions, and adjustment means responsive to high velocity of the wind for moving the turbine blades to their less efficient extreme positions.

3. The wind actuated power generator of claim 2 wherein the adjustment means includes centrifugally responsive means for moving the turbine blades toward their less efficient extreme positions.

4. The wind actuated power generator of claim 3 wherein the first blades are generally overlapping arcuate blades of the Savonius-type.

5. In a wind actuated power generator, bladed rotor means adapted to be turned by wind flow therepast, means mounting the bladed rotor means for rotation on a predetermined axis, electrical generator means including stator means and generator motor means rotatable on said axis, and coupling means drivingly connecting the rotor means.

6. The wind actuated power generator of claim 5 wherein the coupling means comprises a clutch, and means for actuating the clutch when the bladed rotor means attains a predetermined speed.

7. In a wind actuated power generator, bladed rotor means adapted to be turned by wind flow therepast, means mounting the bladed rotor means in a wind stream for rotation on a predetermined axis, load means, and releasable clutch means for coupling the rotor means to the load means.

8. The wind actuated power generator of claim 7 wherein the clutch means is a magnetic clutch, and including voltage means responsive to speed of rotation of the rotor means for actuating the clutch means to couple the rotor means to the load means.

9. In a wind actuated power generator, rotor means, a pair of overlapping, oppositely facing arcuate blades of generally the Savonius-type mounted on the rotor means and defining a pair of inlet passages, a plurality of shutter vanes, means mounting the shutter vanes in the inlet passages for pivotal movement between open positions and positions at least partially closing the inlet passages, means biasing the shutter vanes toward the open positions thereof, and centrifugal weight means on the shutter vanes in positions such as to tend to close the vanes in proportion to the speed of the rotor means.

* * * * *